US012579346B2

(12) United States Patent
Xing et al.

(10) Patent No.: US 12,579,346 B2
(45) Date of Patent: Mar. 17, 2026

(54) APPARATUS AND METHOD FOR PERFORMING COLLISION ANALYSIS

(71) Applicant: SAMSUNG ELECTRONICS CO., LTD., Suwon-si (KR)

(72) Inventors: Tianwei Xing, Santa Clara, CA (US); Wenjun Jiang, San Jose, CA (US); Xun Chen, Fremont, CA (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/201,425

(22) Filed: May 24, 2023

(65) Prior Publication Data

US 2024/0220684 A1     Jul. 4, 2024

Related U.S. Application Data

(60) Provisional application No. 63/434,668, filed on Dec. 22, 2022.

(51) Int. Cl.
*G06F 30/27* (2020.01)
*G06F 119/14* (2020.01)

(52) U.S. Cl.
CPC .......... *G06F 30/27* (2020.01); *G06F 2119/14* (2020.01)

(58) Field of Classification Search
CPC ............................ G06F 30/27; G06F 2119/14
See application file for complete search history.

(56) References Cited

U.S. PATENT DOCUMENTS

| | | | |
|---|---|---|---|
| 11,243,129 | B2 | 2/2022 | Shin et al. |
| 11,254,306 | B2 * | 2/2022 | Stobbe .............. B60W 30/0953 |
| 11,789,457 | B1 * | 10/2023 | Woo ........................ H04R 3/005 |
| | | | 700/253 |
| 11,851,049 | B1 * | 12/2023 | Bethanabhotla ......... H04R 1/08 |
| 2008/0204218 | A1 | 8/2008 | Tupman et al. |
| 2013/0297926 | A1 | 11/2013 | Eaton et al. |
| 2019/0129423 | A1 * | 5/2019 | Matus, Jr. ............ G05D 1/0088 |
| 2019/0370674 | A1 | 12/2019 | Kim et al. |
| 2020/0312461 | A1 * | 10/2020 | Bartsch ............... G01P 15/0891 |

(Continued)

FOREIGN PATENT DOCUMENTS

| | | |
|---|---|---|
| CN | 106979863 A | 7/2017 |
| CN | 108197003 A | 6/2018 |

(Continued)

OTHER PUBLICATIONS

International Search Report (PCT/ISA/210) and Written Opinion (PCT/ISA/237) issued by the International Searching Authority on Oct. 11, 2023 in corresponding International Application No. PCT/KR2023/009439.

*Primary Examiner* — Jensen Hu
(74) *Attorney, Agent, or Firm* — Sughrue Mion, PLLC

(57) ABSTRACT

An electronic device may be provided to perform collision analysis. The electronic device may be configured to: receive sensor data from an inertial-measuring-unit (IMU) sensor; detect that a collision event has occurred based on the sensor data and detect collision data from the sensor data; input the collision data into a collision classification model that is trained to predict a collision material type and a collision intensity of the collision event; and determine an action to be performed by the electronic device based on the collision material type and the collision intensity of the collision event.

15 Claims, 10 Drawing Sheets

(56)        References Cited

U.S. PATENT DOCUMENTS

| | | | | |
|---|---|---|---|---|
| 2020/0334928 | A1* | 10/2020 | Bourke | G06Q 30/0283 |
| 2020/0401851 | A1* | 12/2020 | Mau | G06F 16/583 |
| 2022/0005341 | A1 | 1/2022 | Hui et al. | |
| 2022/0118931 | A1* | 4/2022 | Qi | G06N 3/08 |
| 2022/0152826 | A1* | 5/2022 | Danielczuk | G06V 10/82 |
| 2022/0183625 | A1* | 6/2022 | Gonzales | A61B 5/682 |
| 2022/0245310 | A1* | 8/2022 | Zhong | G06F 30/17 |
| 2022/0277193 | A1* | 9/2022 | Wekel | G06V 20/56 |
| 2023/0256311 | A1* | 8/2023 | Feng | A63B 24/0021 |
| | | | | 473/223 |
| 2024/0346640 | A1* | 10/2024 | Hinduja | G06T 7/0004 |

FOREIGN PATENT DOCUMENTS

| | | | |
|---|---|---|---|
| CN | 113472945 | A | 10/2021 |
| JP | 2014-215184 | A | 11/2014 |
| JP | 6319613 | B1 | 5/2018 |
| KR | 10-2020-0087559 | A | 7/2020 |
| KR | 10-2021-0072408 | A | 6/2021 |
| WO | 2020/087372 | A1 | 5/2020 |
| WO | 2020/141319 | A1 | 7/2020 |

* cited by examiner

3:15 PM　　　📶 10% 🔋

Collison Analysis System

Input collision information:
- 　Collision material (name of the material)
- 　Impact intensity (0 for "soft"; 1 for "hard")

Material:  Wood Floor
Impact Intensity level: ◉ 0　○ 1

SUBMIT FEEDBACK

APPARATUS AND METHOD FOR PERFORMING COLLISION ANALYSIS

CROSS-REFERENCE TO RELATED APPLICATION(S)

This application is based on and claims priority under 35 U.S.C. § 119 to U.S. Provisional Patent Application No. 63/434,668 filed on Dec. 22, 2022, in the U.S. Patent & Trademark Office, the disclosure of which is incorporated herein by reference in its entirety.

BACKGROUND

1. Field

The disclosure relates to an apparatus and a method for detecting and analyzing drop events of electronic devices.

2. Description of Related Art

Collision analysis of mobile devices such as smartphones and tablets is crucial for analyzing device and user behavior, estimating device damage, troubleshooting, and optimizing processes. Collision analysis involves understanding collision details such as impact intensity, collision materials, and potential device damage. However, due to unpredictable collision events and privacy concerns, collision analysis is often performed in real-time with limited sensor data.

Inertial-measuring-unit (IMU) is found in many mobile devices nowadays and can be used for physics-based collision analysis. The IMU incorporates multiple sensors like accelerometers, gyroscopes, and magnetometers, and collision analysis is conducted based on physics models using IMU data to provide collision insight with low cost. However, because of the instability and limited range of IMU sensors on mobile devices, the collected data are often noisy and of low quality, making the physics model fail to provide reliable collision classification.

Existing methods for collision detection based on physics models have limitations due to the false alarm problem and cannot provide detailed analysis or further collision insight. Therefore, there has been a demand for reliable collision classification based on the intensity and material of the collision.

SUMMARY

According to an aspect of the present disclosure, an electronic device for performing collision analysis may include: an inertial-measuring-unit (IMU) sensor configured to collect sensor data; at least memory storing instructions; and at least one processor configured to execute the instructions to: receive the sensor data from the IMU sensor; detect that a collision event has occurred based on the sensor data and detect collision data from the sensor data; input the collision data into a collision classification model that is trained to predict a collision material type and a collision intensity of the collision event; and determine an action to be performed by the electronic device based on the collision material type and the collision intensity of the collision event.

The collision classification model may be trained for hierarchical multi-label classification.

The collision classification model may include one or more neural networks that constitutes a collision material classification model and a collision intensity classification model.

The collision material classification model and the collision intensity classification model may share an input layer and hidden layers, and may have separate output layers configured to output information of the collision material type and the collision intensity, respectively.

The collision classification model may be trained based on a combination of a material classification task loss between the predicted collision material type and a ground-truth material type label for a material classification task, an intensity classification task loss between the predicted collision intensity and a ground-truth intensity label for an intensity classification task, and a task consistency loss that represents a degree of match between the predicted collision material type and the predicted collision intensity.

The task consistency loss may be computed by comparing a pair of the predicted collision material type and the predicted collision intensity with ground-truth inter-class relationships between sample collision material types and sample collision intensities.

The collision classification model may be trained by: accessing the sensor data from previous collision events with a plurality of material types; generating a plurality of training examples by extracting portions of the sensor data for each of the previous collision events, wherein the extracted portions have a same duration but different start times and end times, and wherein each of the plurality of training examples is labeled with a material type and a collision intensity type of the previous collision events; and training the collision classification model with the plurality of training examples.

The action may include at least one of calling an emergency contact, notifying an administrator or a user of the electronic device, and logging the collision event.

The electronic device may further include a user interface configured to receive user feedback about the collision event, wherein the user feedback may include user inputs of the collision material type and the collision intensity of the collision event, and wherein the collision classification model may be updated based on the user feedback.

According to another aspect of the present disclosure, a method for performing collision analysis by an electronic device, may include: receiving sensor data from an inertial-measuring-unit (IMU) sensor; detecting that a collision event has occurred based on the sensor data and detecting collision data from the sensor data; inputting the collision data into a collision classification model that is trained to predict a collision material type and a collision intensity of the collision event; and determining an action to be performed by the electronic device based on the collision material type and the collision intensity of the collision event.

The collision classification model may be trained for hierarchical multi-label classification.

The collision classification model may include one or more neural networks that constitutes a collision material classification model and a collision intensity classification model.

The collision material classification model and the collision intensity classification model may share an input layer and hidden layers, and may have separate output layers configured to output information of the collision material type and the collision intensity, respectively.

The collision classification model may be trained based on a combination of a material classification task loss between the predicted collision material type and a ground-truth material type label for a material classification task, an intensity classification task loss between the predicted collision intensity and a ground-truth intensity label for an intensity classification task, and a task consistency loss that represents a degree of match between the predicted collision material type and the predicted collision intensity.

The task consistency loss may be computed by comparing a pair of the predicted collision material type and the predicted collision intensity with ground-truth inter-class relationships between sample collision material types and sample collision intensities.

The collision classification model may be trained by: accessing the sensor data from previous collision events with a plurality of material types; generating a plurality of training examples by extracting portions of the sensor data for each of the previous collision events, wherein the extracted portions have a same duration but different start times and end times, and wherein each of the plurality of training examples is labeled with a material type and a collision intensity type of the previous collision events; and training the collision classification model with the plurality of training examples.

The action may include at least one of calling an emergency contact, notifying an administrator or a user of the electronic device, and logging the collision event.

The method may further include: receiving user feedback about the collision event, via a user interface, wherein the user feedback may include user inputs of the collision material type and the collision intensity of the collision event, and updating the collision classification model based on the user feedback.

According to another aspect of the present disclosure, there is provided a non-transitory computer readable storage medium that stores instructions to be executed by at least one processor included in an electronic device to perform a method for performing collision analysis. The method for performing collision analysis may include: receiving sensor data from an inertial-measuring-unit (IMU) sensor; detecting that a collision event has occurred based on the sensor data and detecting collision data from the sensor data; inputting the collision data into a collision classification model that is trained to predict a collision material type and a collision intensity of the collision event; and determining an action to be performed by the electronic device based on the collision material type and the collision intensity of the collision event.

Additional aspects will be set forth in part in the description that follows and, in part, will be apparent from the description, or may be learned by practice of the presented embodiments of the disclosure.

BRIEF DESCRIPTION OF THE DRAWINGS

The above and other aspects, features, and aspects of embodiments of the disclosure will be more apparent from the following description taken in conjunction with the accompanying drawings, in which.

DETAILED DESCRIPTION

Figure 1:
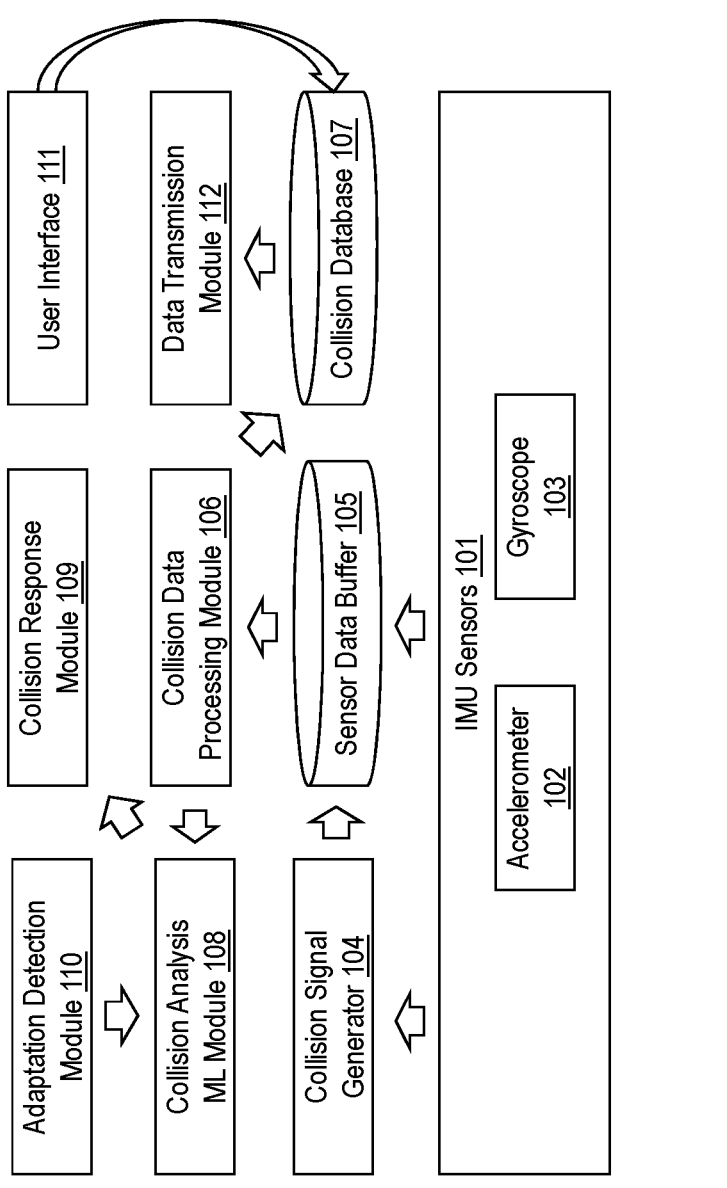
FIG. 1 illustrates a collision analysis system for mobile devices according to embodiments of the present disclosure.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

While such terms as "first," "second," etc., may be used to describe various elements, such elements must not be limited to the above terms. The above terms may be used only to distinguish one element from another.

The term "component" is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

According to embodiments of the present disclosure, a system for analyzing collisions of mobile devices utilizes a machine learning model to provide insights on collision impact intensity and collision material classification. The system may employ a customized loss function and a hierarchical multiclass classification approach to leverage inter-class relationships. The system may be configured to respond differently to various collisions based on the analysis results.

Further, according to embodiments of the present disclosure, the system may support updating the machine learning model after deployment to adapt to new environments. The system may detect the need for adaptation automatically and may collect collision data with annotated user feedback on collision events to fine-tune the model during idle time.

FIG. 1 illustrates a collision analysis system for mobile devices according to embodiments of the present disclosure.

As shown in FIG. 1, the collision analysis system may include IMU sensors 101, a collision signal generator 104, a sensor data buffer 105, a collision data processing module 106, a collision database 107, a collision analysis machine learning (ML) module 108, a collision response module 109, an adaptation detection module 110, a user interface 111, and a data transmission module 112.

The collision analysis system continuously monitors sensor data streams from the IMU sensors 101, and detects pre-collision (e.g., free-fall) or collision events (e.g., impact) using the collision signal generator 104.

The IMU sensors 101 may include an accelerometer 102 and a gyroscope 103. The accelerometer 102 and the gyroscope 103 may be used together in drop detection systems to provide more accurate and reliable data.

The accelerometer 102 may measure changes in linear acceleration in one or more directions. When a mobile device is dropped, it experiences an acceleration in the direction of the drop, which is detected by the accelerometer 102 that is included in or attached to the mobile device.

The gyroscope 103 may detect changes in rotational acceleration or angular velocity. In drop detection, the gyroscope 103 may detect any rotation or spinning of the device during the drop.

Both the accelerometer 102 and the gyroscope 103 may send the sensor data streams to the collision signal generator 104, which may generate a collision signal including collision data when the sensor data stream meets a certain condition. For example, when a change in acceleration and/or orientation exceeds a predetermined threshold, a drop event is detected and a collision signal is generated.

In an embodiment of the present disclosure, when an acceleration norm is greater than a predetermined threshold, the collision signal may be generated. The acceleration norm may refer to the magnitude of an acceleration vector, which is the square root of the sum of the squares of the acceleration in each direction, and may represent the overall intensity of the acceleration. To measure the acceleration norm, the accelerometer 102 may measure acceleration in three dimensions (x, y, and z), and may output data as either raw acceleration values or as acceleration in units of gravitational force (g). For example, the acceleration norm may be computed using the following equation:

$$\text{acceleration}_{norm} = \sqrt{\text{acceleration}_x^2 + \text{acceleration}_y^2 + \text{acceleration}_z^2},$$

where $\text{acceleration}_x$, $\text{acceleration}_y$, and $\text{acceleration}_z$ are acceleration values in the x, y, and z directions, respectively.

Once a collision signal is received, the sensor data buffer 105 begins to buffer the collision data for a predefined period. The buffered collision data is processed by the collision data processing module 106 with interpolation and resampling and stored in the collision database 107 for future training if model adaptation is required.

The collision data processing module 106 may perform interpolation to estimate a position and a velocity of the mobile device at specific points in time, based on the collision data that have been collected from the accelerometer 102 and the gyroscope 103 at different points in time. The collision data processing module 106 may detect subtle changes in the motion of the mobile device that might not be apparent from the raw collision data.

The collision data processing module 106 may perform resampling to adjust a sample rate of the collision data (i.e., the time resolution of the collision data) either by increasing or decreasing the number of data points per unit of time. The resampling may be performed to align the data stream collected from the accelerometer 102 and the gyroscope 103, which may have different sampling rates, and to compare the collision data to a reference model or reference data.

The collision analysis ML module 108 contains a machine learning (ML) based collision classification model that uses one or more neural networks for analyzing the processed collision data and may output a classification result for collision response. The collision classification model 108 may be updated later to adapt to new environments.

The collision response module 109 may respond to the collision based on the analysis result, and may allow a user to configure a specific collision response for different cases via the user interface 111.

The adaptation detection module 110 may detect if adaptation of the collision classification model is required based on the environment, user, or other predefined policies. If adaptation is required, the collision classification model is updated to adapt to a new data distribution.

The user interface 111 may receive a user input providing feedback on the collisions. The feedback may be used as the collision annotations, which are stored in the collision database 107 in association with the collision data. The user interface 111 may allow the user to configure a collision response (e.g., see FIG. 4).

The data transmission module 112 may transmit the collected collision data and their annotations to a cloud server periodically or upon request.

According to embodiments of the present disclosure, the collision analysis system may detect pre-collision or collision events, process and analyze the collision data, provide appropriate collision responses, and adapt to new environments. The collision analysis system may be used for device and user behavior analysis, device damage estimation, troubleshooting, and process optimization.

Figure 2:
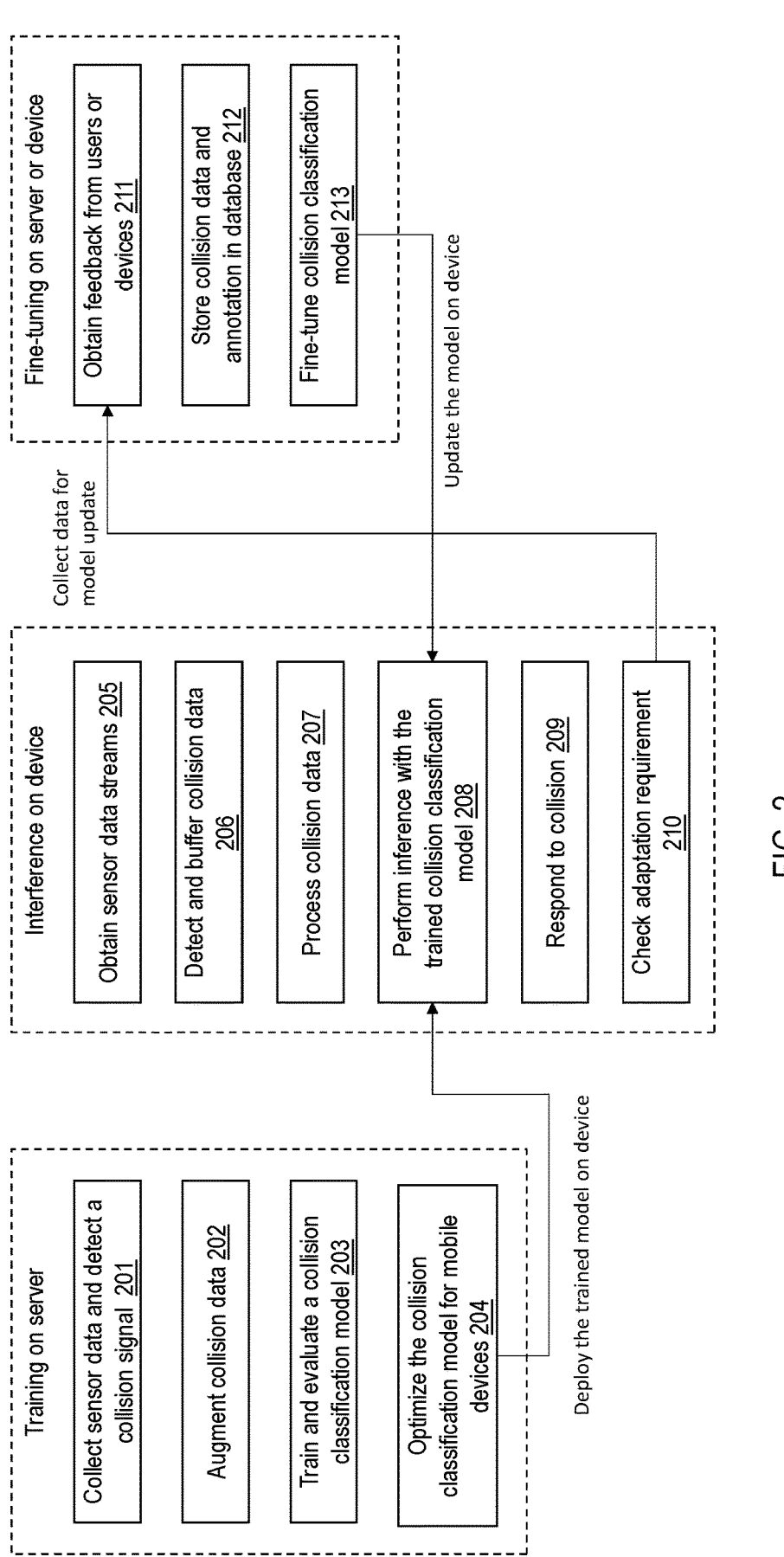
FIG. 2 illustrates a method of generating, operating, and updating a collision analysis system according to embodiments of the present disclosure.

FIG. 2 illustrates a method of generating, operating, and updating a collision analysis system according to embodiments of the present disclosure.

FIG. 2 shows a training stage, an inference stage, and a model updating stage. In the training stage, a collision classification model is developed via machine learning training. In the inference stage, the collision data is analyzed using the trained collision classification model. Finally, in the model updating stage, the Collision classification model is updated to enhance its accuracy and efficiency.

The training of the collision classification model may be performed by: accessing the sensor data from previous collision events with a plurality of material types; generating a plurality of training examples by extracting portions of IMU sensor data for each of the previous collision events, wherein the extracted portions have a same duration but different start times and end times, and wherein each of the plurality of training examples is labeled with a material type and a collision intensity type of the previous collision events; and training the collision classification model with the plurality of training examples.

Specifically, the training stage includes operation 201 of collecting sensor data and detecting a collision signal, operation 202 of augmenting collision data included in the collision signal, operation 203 of training a collision classification model based on the augmented collision data, and operation 204 of optimizing the collision classification model for mobile devices.

A machine learning or deep learning model may be utilized to distinguish collision patterns of various materials. A collision data collection app may be used to collect diverse collision data with various device movement patterns and collision materials under a standard data collection paradigm. Once collected, the collision data is segmented and annotated automatically to create a collision dataset that includes all detected collision events. The dataset is then used to train and evaluate the collision classifier model, utilizing hierarchical labels to capture inter-class relationships. Various data processing and augmentation techniques are applied to the dataset to improve the model's performance.

In operating 201, the sensor data may be collected from an IMU sensor, including an accelerometer, a gyroscope, and/or a magnetometer, to measure the motion and orientation of a device. The collected data is then processed to identify any patterns or anomalies that could indicate a collision. Detecting a collision signal may involve analyzing various aspects of the sensor data, such as changes in acceleration, rotation, or magnetic field strength. For example, sudden changes in acceleration or rotation that exceed a certain threshold could be indicative of a collision. Similarly, if the magnetic field strength drops suddenly or changes direction, it may also suggest a collision.

In operation 202, the collision data may be augmented to train the collision classification model, via data synthesis, data transformation, data combination, and/or data labeling. Data synthesis may be performed to general additional data by synthesizing new collision data that resemble the original collision data but with variations in parameters of the original collision data. For example, new collision scenarios can be generated by modifying the speed, direction, and location of the collision. Data transformation may be performed by applying rotation, scaling, flipping, or adding noise to the original collision data to create new variations of the original collision data. Data combination may be performed by combining different sources of data, with the original collision data to create a more comprehensive dataset that captures a wider range of features. Data labeling may be performed by labeling the original collision data with additional information such as the type of collision, severity, and other relevant parameters. By augmenting the collision data in these ways, the resulting dataset can be more diverse and representative, which can help improve the accuracy and generalization of the collision classification model.

In operation 203, the collision classification model may be trained via iteration and evaluated at each iteration to determine whether additional training is needed. The collision classification model may provide information about a collision, including an intensity level of the collision (e.g., soft-collision or hard-collision) and a type of collision material (e.g., carpet, wood floor, or bed cushion) on which the device is dropped. This classification result enables different actions to be taken, such as notifying emergency services, alerting the user or IT administrator, logging the event, and more.

The collision classification model may be a multiclass classification model that includes an input layer to receive the collision data, hidden layers provided between the input layers and output layers to complex transformations on the input data, and at least two output layers configure to produce at least two different classification outputs, such as an intensity level of the collision and a type of collision material involved.

In operation 204, the collision classification model may be optimized to reduce the computation and memory requirement for mobile devices, for example, via quantization, pruning, and/or compression. Quantization may be performed to convert the model weights and activations from floating-point precision to lower precision formats to reduce the model size and accelerate the inference process. Pruning may be applied to reduce the number of unnecessary parameters in the collision classification model. Compression may be applied to reduce the size of the collision classification model by removing redundancies and compressing the model representation.

The training stage may be performed on a server and then deployed on an electronic device (or a mobile device), but the embodiments are not limited thereto and the training stage may be performed on the electronic device.

The inference stage may include operation 205 of obtaining sensor data streams from the IMU sensors 101, operation 206 of detecting and buffering collision data that are detected from the sensor data streams, operation 207 of processing the collision data, operation 208 of performing inference via the trained collision classification model, operation 209 of responding to the collision, and operation 210 of checking an adaptation requirement(s).

During inference, the collision analysis system responds to a collision to provide information of an intensity of the collision and a type of a material that the device collided with. The collision analysis system then checks whether adaptation is necessary. Adaptation is determined by examining whether there have been any changes to a user of the collision analysis system, a location at which the device is used, or other user-defined policies such as model performance. If adaptation is determined to be required in operation 210, the collision analysis system enters a model update mode, so that fine-tuning is performed on the server or the electronic device.

The model updating stage includes operation 211 of collecting feedback from the user or the electronic device to gather annotations for the collision data that is stored in the collision database, operation 212 of storing the annotations in association with the collision data in the collision database, and operation 213 of updating the collision classification model to fine-tune neural network parameters of the collision classification model, based on the collision data and the annotation data. Operation 213 may be performed regularly, or when the electronic device or the collision analysis system is in an idle state. The collision analysis system may run on the electronic device in real time.

Figure 3:
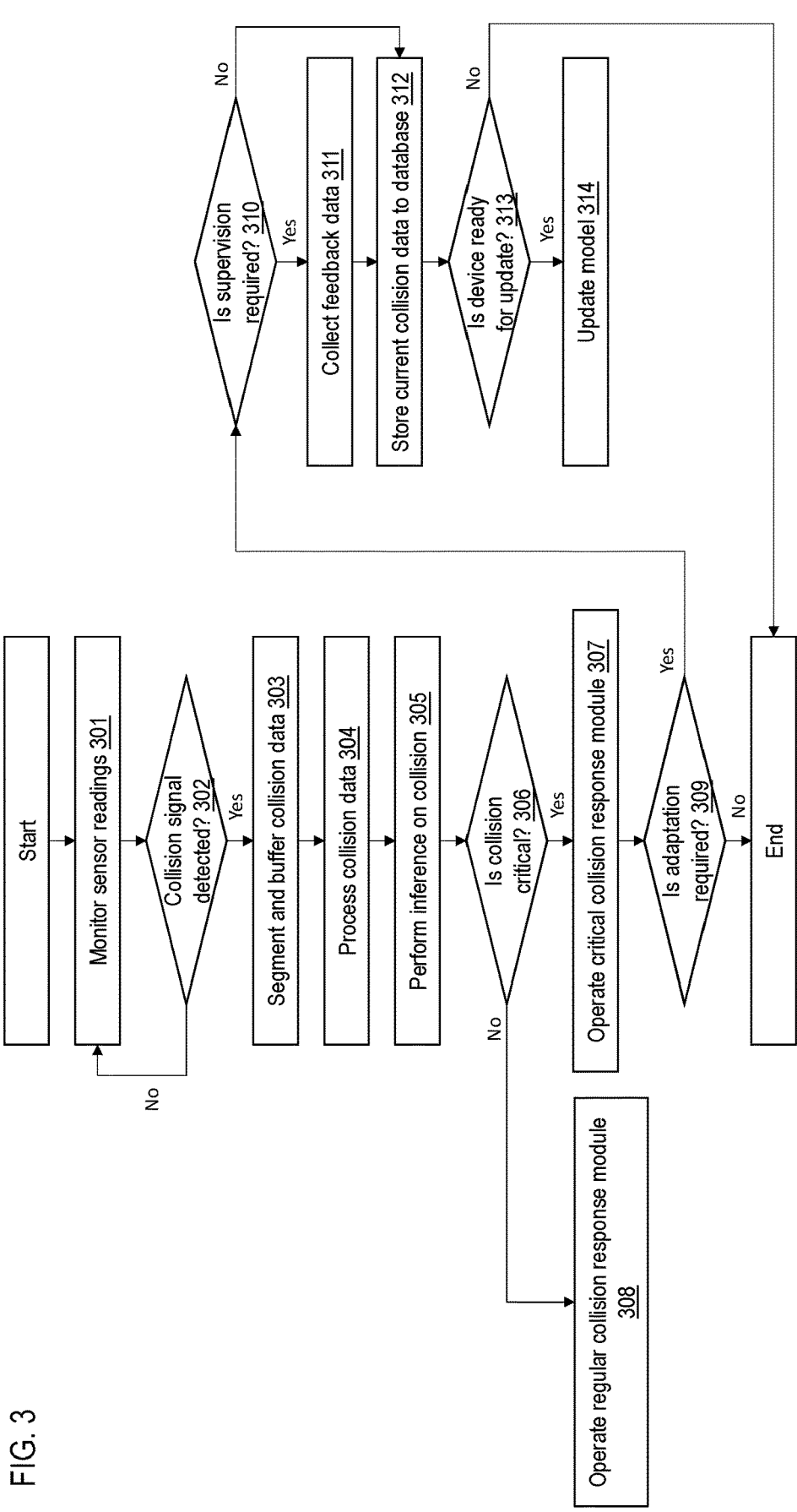
FIG. 3 is a flowchart illustrating an inference process for analyzing a collision according to embodiments of the present disclosure.

FIG. 3 is a flowchart illustrating an inference process for analyzing a collision according to embodiments of the present disclosure.

During the inference process, the collision analysis system may monitor sensor data that are collected from an IMU sensor, including an accelerometer, a gyroscope, and/or a magnetometer, in operation 301.

In operation 302, a predetermined physics model is applied to the sensor data to detect a collision signal. The physics model may be configured to detect a collision signal when a change in acceleration, orientation, and/or magnetic field exceeds a predetermined threshold. For example, the physics model may generate a collision signal when the acceleration norm exceeds a predetermined threshold.

If a pre-collision event exists, such as a free fall event where the acceleration norm is zero, the collision analysis system begins buffering the sensor data when the collision signal generator detects the sensor data. If a pre-collision event does not exist, the collision analysis system may either keep buffering the sensor data using a buffer queue or start buffering the sensor data when a collision is detected, depending on a setting of the collision analysis system.

Once a collision signal is detected in operation 302, the collision analysis system may wait for a predetermined period of time to gather all collision related sensor data, and may perform buffering and segmentation on the collision data before sending it for processing and analysis, in operation 303.

Buffering may be performed to store a certain amount of collision data in memory before processing it to ensure that the collision data collected from the IMU sensor is complete and accurate. In device drop detection, buffering may be needed to ensure that the accelerometer data recorded during a drop event is captured in its entirety, including both the pre-collision and post-collision signals. Segmentation may be performed to divide the continuous collision data stream into smaller, fixed-length segments. In device drop detection, segmentation may be needed to isolate the data corresponding to individual drop events from the continuous sensor data stream. By segmenting the collision data, it becomes easier to identify the exact time of collision, which is useful for determining the collision intensity and other related parameters. Once the collision data is buffered and segmented, it may be processed further using a machine learning algorithm to detect and classify drop events.

In operation 304, the buffered collision data may be processed, for example, by performing interpolation based on timestamps of sensor values of the collision data and by resampling the collision data to fit a predefined input size of a collision classification model.

In operation 305, the processed collision data may be fed to the trained collision classification model, which outputs a collision analysis result, including a collision intensity and a collision material.

In operation 306, the collision analysis system may determine whether the collision is critical, based on the collision analysis result, referring to predetermined conditions including a collision intensity level and collision materials which cause critical collisions. For example, when the collision intensity is greater than or equal to a predetermined critical collision intensity level, and the collision material corresponds to one of a plurality of predetermined critical collision materials (e.g., hard wood, concrete, etc.), the collision is determined as a critical collision.

In operations 307 and 308, the collision analysis system responds to the collision with either a regular collision response or a critical collision response, depending on the nature of the collision. The user may configure different collision responses such as logging the collision event, notifying an IT administrator, or calling emergency services. The collision response provided may be determined by the user's settings. For example, according to the user's settings, a collision event is logged without being notified to the user if the collision is a non-critical regular collision. On the other hand, if the collision is a critical collision, the collision event is logged and is notified to the user, and an emergency service may be called.

In operation 309, after responding to the collision, the collision analysis system may check whether the collision classification model needs to adapt to a new environment. The criteria for model adaptation may be predefined by the user, such as changes in location, user, or model performance. If adaptation is necessary, the collision analysis system may collect current sensor data.

In operation 310, it is determined whether adaptation is to be performed in a supervised manner based on a default model training setting or a user's model training setting. If supervision is required, the collision analysis system collects feedback from the user and/or the electronic device, and stores the collision data along with annotations in the collision database in operations 311 and 312. If supervision is not required, only the collision data are stored in operation 312.

In operation 313, the collision analysis system determines whether the electronic device is ready to update the collision classification model. For example, when the electronic device or the collision classification model installed on the electronic device is in an idle state, the collision analysis system determines that the electronic device is ready to update the collision classification model.

In operation 314, when the electronic device is ready to update the collision classification model, the stored collision data is used to update the collision classification model to fine-tune neural network parameters of the collision classification model.

Figure 4:
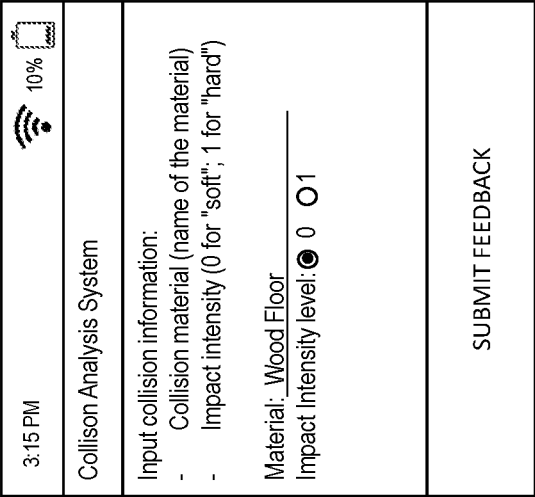
FIG. 4 illustrates a user interface for collecting user feedback about a collision according to embodiments of the present disclosure.

FIG. 4 illustrates a user interface for collecting user feedback about a collision according to embodiments of the present disclosure.

An electronic device may provide a user interface to collect user feedback about a collision, to enable the training of the collision classification model to be performed in a supervision manner. When a collision is detected, the electronic device may allow the user to input feedback about the collision, including a collision material (e.g., wood floor) and an intensity level (e.g., hard or soft). The feedback may be stored as annotations of the collision, and may be stored together with the corresponding collision in the collision database, so that the collision classification model is updated using the collision data including the annotations.

Figure 5:
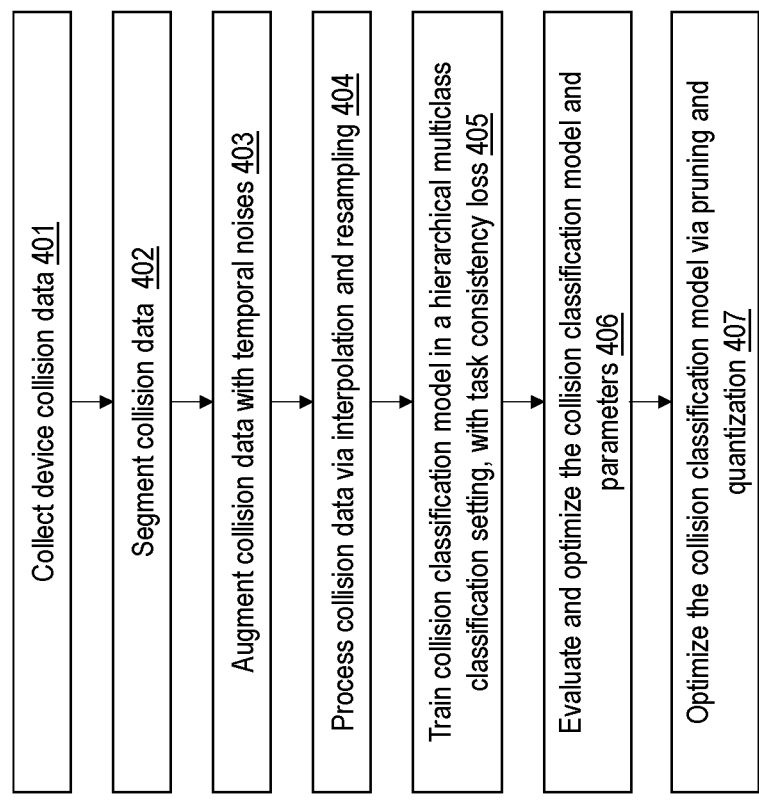
FIG. 5 is a flowchart illustrating a training process for training a collision classification model according to embodiments of the present disclosure.

FIG. 5 is a flowchart illustrating a training process for training a collision classification model according to embodiments of the present disclosure.

In operation 401, a collision collection app installed on an electronic device collects sensor data while various collisions are performed against different materials using the electronic device (or other types of electronic devices). A collision signal may be detected from the sensor data by using a physics model. The collision signal may cover a pre-collision event (e.g., a free-fall event) and a collision event.

In operation 402, collision data may be obtained from the collision signal and may be segmented into periods of length T1.

In operation 403, data augmentation may be performed on the collision data by sliding a segmentation window within a range of T2, with a fixed or random stride of T3, for example, by adding noises and temporal variations to the collision data.

In operation 404, after augmentation, the collision data may be processed by interpolation and resampling to fit an input size of the collision analysis model.

In operation 405, a collision classification model may be trained in a hierarchical multiclass classification setting that utilizes the inter-class relationships between different collision categories, with a task consistency loss. The collision classification model may be trained using a supervised gradient-descent-based approach.

A collision classification model $f(\theta)$ may receive, as input, collision data X, and may process and transform the collision data X into different collision material classes Y (task Y) and collision intensity levels Z (task Z), for example, as follows:

$$Y = f_1(\theta)(X)$$

$$Z = f_2(\theta)(X)$$

$\theta$ denotes trainable parameters of the collision classification model $f(\theta)$. The collision classification model $f(\theta)$ may include a collision intensity classification model $f_1(\theta)$ and a collision material classification model $f_2(\theta)$ that share the same backbone structure. The collision intensity classification model $f_1(\theta)$ and the collision material classification model $f_2(\theta)$ may share an input layer and hidden layers, and may have two separate layers.

If task Y has M classes and task Z has N classes, a fixed mapping may be created to map Y to Z, such that every class Y in task Y may be mapped to a corresponding single class $Z_i$ in task Z. The mapping relationship may be represented using an M×N matrix $A^{M \times N}$ as follows:

$$A_{i,j} = \begin{cases} 1, & \text{if class } Y_i \text{ in task } Y \text{ is mapped to class } Z_j \text{ in task } Z \\ 0, & \text{otherwise} \end{cases}$$

The mapping relationship matrix may be used as a ground-truth value in calculating the task consistency loss. Each collision data sample $x_i$ may be annotated with labels $y_i$ and $z_i$ for both task Y and task Z. The model training setting handles the collision material and collision intensity problem in the collision analysis system, where collisions on materials like concrete or metal floor are classified as hard landings, and collisions on hands or cushions are classified as soft landings.

Figure 6:
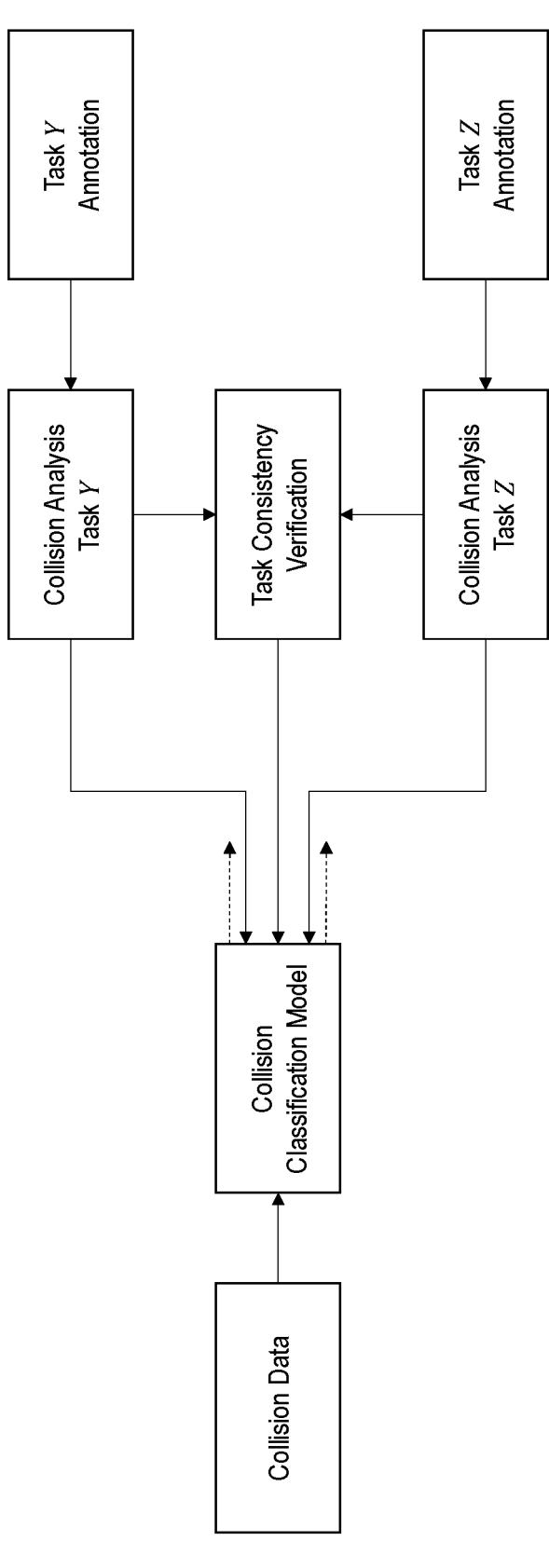
FIG. 6 illustrates a backward path of the training process according to embodiments of the present disclosure.

FIG. 6 illustrates a forward path and a backward path of the training process according to embodiments of the present disclosure.

In the forward path, collision data $x_i$ is input to the collision classification model $f(\theta)$, and the collision classification model $f(\theta)$ may output two logic vectors $\hat{y}_i$ and $\hat{z}_i$ that represent a collision material and a collision intensity, respectively. The logic vectors $\hat{y}_i$ and $\hat{z}_i$ may be expressed as:

$$Y_i = f_1(\theta)(x_i)$$

$$Z_i = f_2(\theta)(x_i)$$

where $\hat{y}_i$ and $\hat{z}_i$ have M and N dimensions.

In the backward path, a loss function is determined as a combination of task losses and a task consistency loss. For task Y and task Z, the loss function may be determined as a cross-entropy loss as follows:

$$Loss_Y = CE\ (f_1(\theta)(x_i),\ y_i)$$

$$Loss_Z = CE\ (f_2(\theta)(x_i),\ z_i)$$

Lossy may represent a material classification task loss between a predicted collision material type and a ground-truth material type label for a material classification task (i.e., task Y). $Loss_Z$ may represent an intensity classification task loss between a predicted collision intensity and a ground-truth intensity label for an intensity classification task (i.e., task Z).

The task consistency loss may be determined as:

$$Loss_{consistency} = \amalg f_1(\theta)(x_i) \times A - f_2(\theta)(x_i) \amalg_2$$

The task consistency loss $Loss_{consistency}$ may be computed by comparing a pair of the predicted collision material type and the predicted collision intensity with ground-truth inter-class relationships between sample collision material types and sample collision intensities. Information of the ground-truth inter-class relationships may be included in the above-mentioned mapping relationship matrix.

A final loss function may be determined as:

$$Loss_{final} = Loss_Y + \alpha Loss_Z + \beta Loss_{consistency}$$

A gradient-based method may be applied to find optimal parameters of the collision classification model by minimizing the final loss. The final loss may be determined as being minimized when the final loss has reached a predetermined minimum value, or does not reduce any longer via the iteration process and therefore reaches a constant value (with a predetermined margin).

Referring back to FIG. 5, in operation 406, after training, the collision classification model is evaluated on a testing dataset that is collected and processed in substantially the same way as the training set to determine performance metrics of the collision classification model.

In operation 407, the collision classification model is optimized via pruning and quantization, and is then deployed on a target electronic device.

Figure 7:
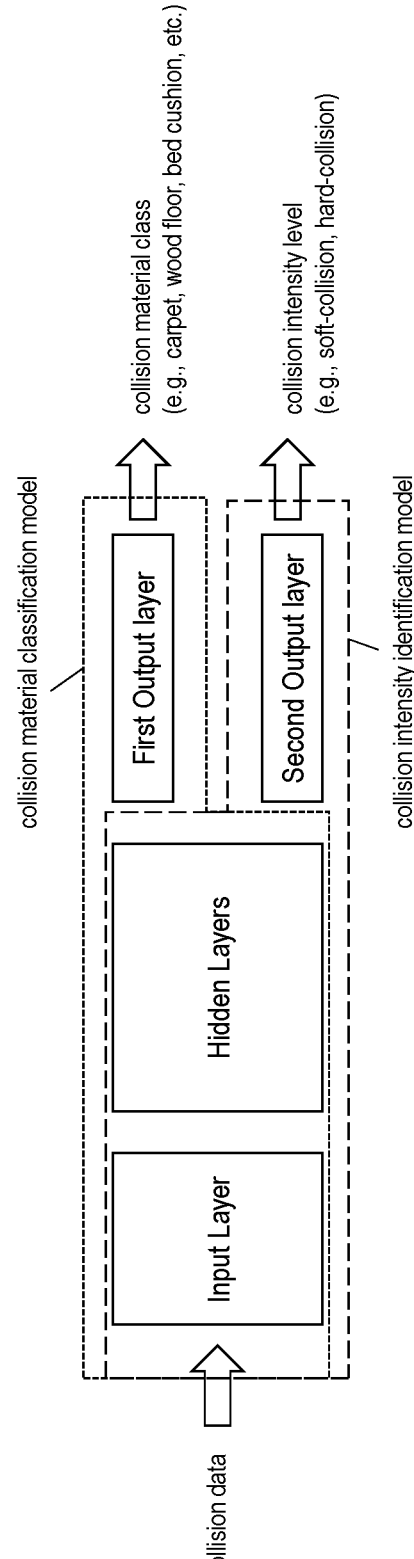
FIG. 7 illustrates the structure of a collision classification model according to embodiments of the present disclosure.

FIG. 7 illustrates the structure of a collision classification model according to embodiments of the present disclosure.

The collision classification model may use one or more neural networks to provide multi-class classification results.

The collision classification model may include an input layer to receive collision data as input, hidden layers provided between the input layer and output layers, and two separate outputs layers: a first output layer that outputs information about a collision material, and a second output layer that outputs information about collision intensity.

The input layer, the hidden layers, and the first output layer may constitute a collision material classification model, which is configured to receive collision data as input, and provides a collision material class as output. The collision material class may have a higher class indicating whether the collision material is a soft material or a hard material, and a lower class indicating a specific type of the soft material or the hard material(e.g., carpet, wood floor, bed cushion, etc.).

The input layer, the hidden layers, and the second output layer may constitute a collision intensity classification model, which is configured to receive collision data as input, and provides a collision intensity level as output. The collision intensity level may have a higher class indicating whether the collision is a soft collision or a hard collision, and a lower class indicating a specific intensity of the soft collision or the hard collision.

Figure 8:
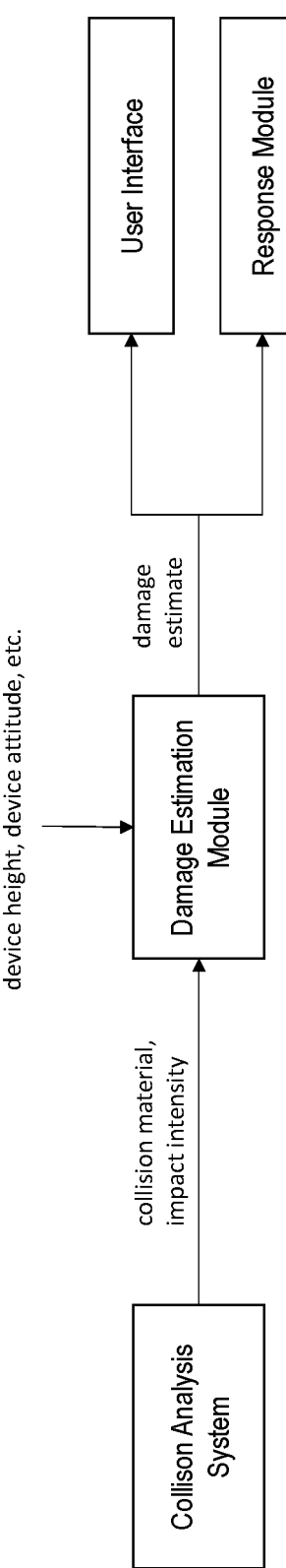
FIG. 8 is a block diagram illustrating a device damage estimation system including the collision analysis system according to embodiments of the present disclosure.

FIG. 8 is a block diagram illustrating a device damage estimation system including the collision analysis system according to embodiments of the present disclosure.

Referring to FIG. 8, the collision analysis system may interact or interoperate with a damage estimation module.

The collision analysis system may utilize sensor data that is collected from an IMU sensor when an electronic device including the IMU sensor, drops and collides with an object. The collision analysis system may perform an inference on a material of the object and an intensity of the collision via the collision classification model, and may output information of the collision material and the collision intensity.

The damage estimation module may receive a collision inference result, including information of the collision material and the collision intensity, from the collision analysis system. The damage estimation module may also receive other collected information such as a drop height and a device attitude, to estimate the damage sustained by the electronic device. The damage estimation model may be a heuristic function, a logic-rule-based method with prior damage history as a reference point, or any machine learning model.

The damage estimation module may output a damage estimation result that falls into one of the three categories: no damage, minor damage, and heavy damage.

The damage estimation module may output the damage estimation result to a user interface configured to display the damage estimation result to a user or an IT administrator. The damage estimation module may also output the damage estimation result to a response module configured to take an action according to the damage estimation result, such as contacting an IT administrator or calling an emergency service. The types of responses conducted by the response module are configurable by the user.

Figure 9:
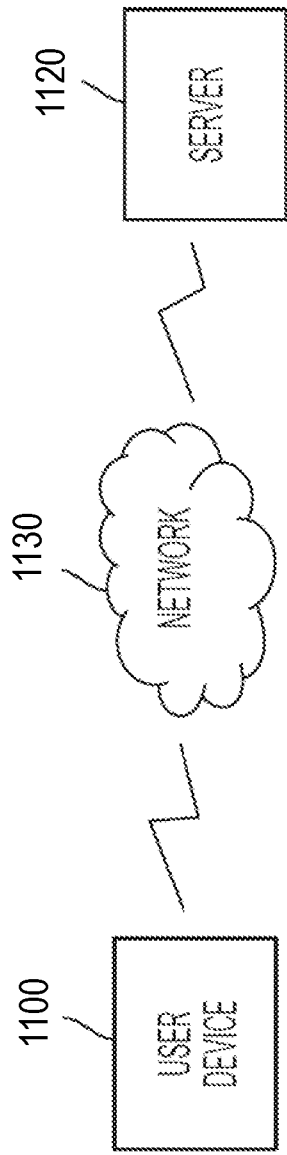
FIG. 9 is a diagram of devices for performing collision analysis according to embodiments of the present disclosure.

FIG. 9 is a diagram of devices for performing collision analysis according to embodiments of the present disclosure. FIG. 9 includes a user device 1100, a server 1120, and a network 1130. The user device 1110 and the server 1120 may interconnect via wired connections, wireless connections, or a combination of wired and wireless connections.

The user device 1100 includes one or more devices configured to receive a trained collision classification model from the server 1120 and collect a collision signal from a sensor, and perform an inference process by inputting the collision signal to the trained collision classification model to determine a collision intensity and a collision material. For example, the user device 1100 may include a computing device (e.g., a desktop computer, a laptop computer, a tablet computer, a handheld computer, a smart speaker, a server, etc.), an IMU sensor such as an accelerometer and a gyrospoe, a mobile phone (e.g., a smart phone, a radiotelephone, etc.), a camera device, a wearable device (e.g., a pair of smart glasses or a smart watch), or a similar device.

The server 1120 includes one or more devices configured to train the collision classification model and transmit the collision classification model to the user device 1100.

The network 1130 includes one or more wired and/or wireless networks. For example, network 1130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 9 are provided as an example. In practice, there may be additional devices and/or networks, fewer devices and/or networks, different devices and/or networks, or differently arranged devices and/or networks than those shown in FIG. 9. Furthermore, two or more devices shown in FIG. 9 may be implemented within a single device, or a single device shown in FIG. 9 may be implemented as multiple, distributed devices. Additionally, or alternatively, a set of devices (e.g., one or more devices) may perform one or more functions described as being performed by another set of devices.

Figure 10:
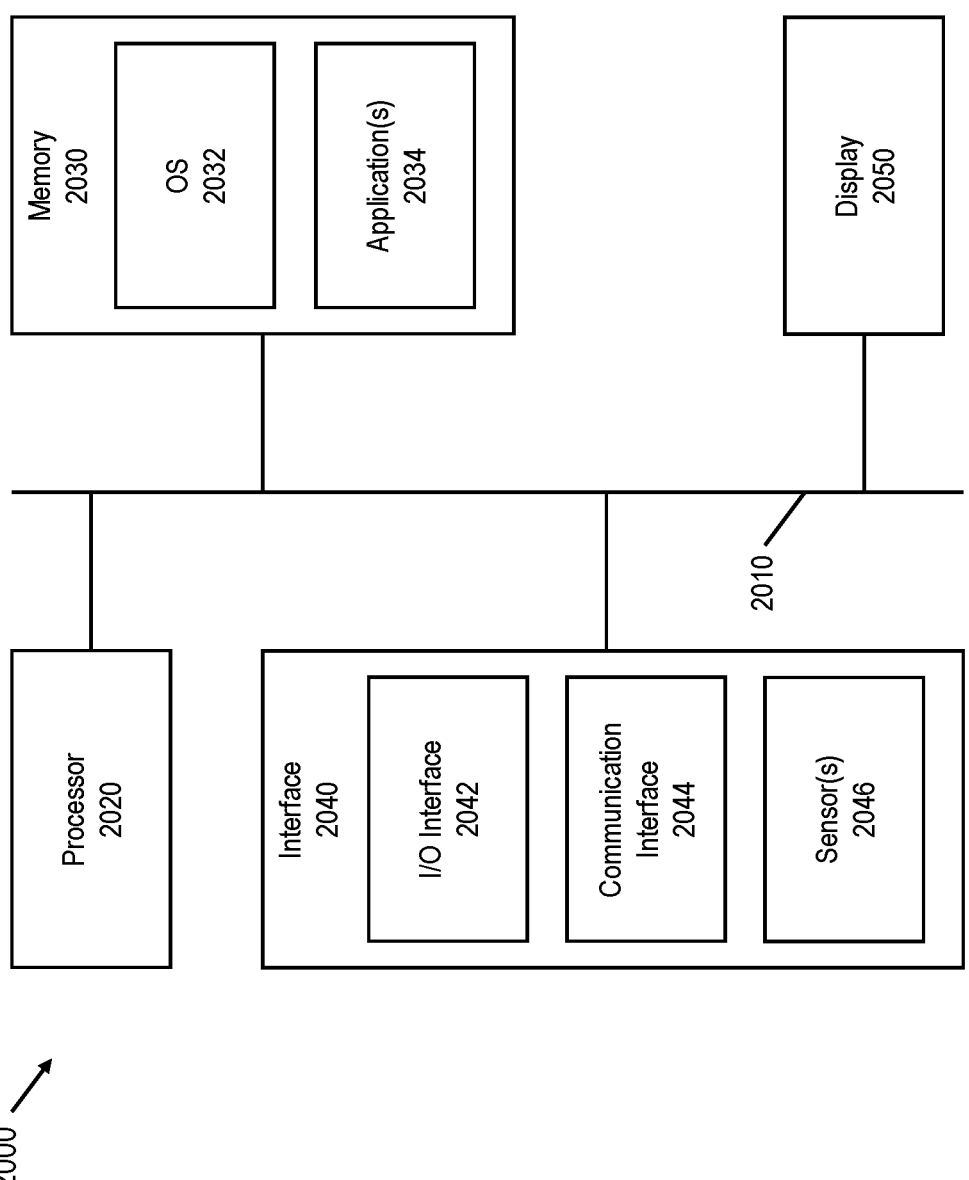
FIG. 10 is a diagram of components of one or more devices of FIG. 9 according to embodiments of the present disclosure.

FIG. 10 is a diagram of components of one or more devices of FIG. 9 according to embodiments of the present disclosure. An electronic device 2000 may correspond to the user device 1100 and/or the server 1120.

The electronic device 2000 includes a bus 2010, a processor 2020, a memory 2030, an interface 2040, and a display 2050.

The bus 2010 includes a circuit for connecting the components 2020 to 2050 with one another. The bus 2010 functions as a communication system for transferring data between the components 2020 to 2050 or between electronic devices.

The processor 2020 includes one or more of a central processing unit (CPU), a graphics processor unit (GPU), an accelerated processing unit (APU), a many integrated core (MIC), a field-programmable gate array (FPGA), a digital signal processor (DSP), a machine learning accelerator, a neural processing unit (NPU). The processor 2020 may be a single core processor or a multi core processor. The processor 2020 is able to perform control of any one or any combination of the other components of the electronic device 2000, and/or perform an operation or data processing relating to communication. For example, the processor 2020 executes one or more programs stored in the memory 2030, to operate the collision signal generator 104, the collision data processing module 106, the collision analysis machine learning module 108, the collision response module 109, the adaptation detection module 110, the user interface 111, and the data transmission module 112 which are illustrated in FIG. 1.

The memory 2030 may include a volatile and/or non-volatile memory. The memory 2030 stores information, such as one or more of commands, data, programs (one or more instructions), applications 2034, etc., which are related to at least one other component of the electronic device 2000 and for driving and controlling the electronic device 2000. For example, commands and/or data may formulate an operating system (OS) 2032. Information stored in the memory 2030 may be executed by the processor 2020. In particular, the memory 2030 may include the sensor data buffer 105 and the collision database 107 illustrated in FIG. 1.

The applications 2034 include the above-discussed embodiments. These functions can be performed by a single application or by multiple applications that each carry out one or more of these functions.

The display 2050 includes, for example, a liquid crystal display (LCD), a light emitting diode (LED) display, an organic light emitting diode (OLED) display, a quantum-dot light emitting diode (QLED) display, a microelectrome-chanical systems (MEMS) display, or an electronic paper display. The display 2050 can also be a depth-aware display, such as a multi-focal display. The display 2050 is able to present, for example, various contents, such as text, images, videos, icons, and symbols.

The interface 2040 includes input/output (I/O) interface 2042, communication interface 2044, and/or one or more sensors 2046. The I/O interface 2042 serves as an interface that can, for example, transfer commands and/or data between a user and/or other external devices and other component(s) of the electronic device 2000.

The communication interface 2044 may enable communication between the electronic device 2000 and other external devices, via a wired connection, a wireless connection, or a combination of wired and wireless connections. The communication interface 2044 may permit the electronic device 2000 to receive information from another device and/or provide information to another device. For example, the communication interface 2044 may include an Ethernet interface, an optical interface, a coaxial interface, an infrared interface, a radio frequency (RF) interface, a universal serial bus (USB) interface, a Wi-Fi interface, a cellular network interface, or the like. The communication interface 2044 may receive a trained collision classification model from the server 1120.

The sensor(s) 2046 of the interface 2040 can meter a physical quantity or detect an activation state of the electronic device 2000 and convert metered or detected information into an electrical signal. For example, the sensor(s) 2046 may include the IMU sensors 101 as such the accelerometer 102 and the gyroscope 103. The sensor(s) 2046 can also include any one or any combination of a microphone, a keyboard, a mouse, and one or more buttons for touch input. In addition, the sensor(s) 2046 can include a control circuit for controlling at least one of the sensors included herein. Any of these sensor(s) 2046 can be located within or coupled to the electronic device 2000.

The collision classification machine learning model and the collision classification method according to embodiments of the present application may be written as computer-executable programs or instructions that may be stored in a medium.

The medium may continuously store the computer-executable programs or instructions, or temporarily store the computer-executable programs or instructions for execution or downloading. Also, the medium may be any one of various recording media or storage media in which a single piece or plurality of pieces of hardware are combined, and the medium is not limited to a medium directly connected to an electronic device, but may be distributed on a network. Examples of the medium include magnetic media, such as a hard disk, a floppy disk, and a magnetic tape, optical recording media, such as CD-ROM and DVD, magneto-optical media such as a floptical disk, and ROM, RAM, and a flash memory, which are configured to store program instructions. Other examples of the medium include recording media and storage media managed by application stores distributing applications or by websites, servers, and the like supplying or distributing other various types of software.

The collision classification machine learning model and the collision classification method may be provided in a form of downloadable software. A computer program product may include a product (for example, a downloadable application) in a form of a software program electronically distributed through a manufacturer or an electronic market. For electronic distribution, at least a part of the software program may be stored in a storage medium or may be temporarily generated. In this case, the storage medium may be a server or a storage medium of server.

A model related to the neural networks described above may be implemented via a software module. When the model is implemented via a software module (for example, a program module including instructions), the model may be stored in a computer-readable recording medium.

Also, the model may be a part of the electronic device described above by being integrated in a form of a hardware chip. For example, the model may be manufactured in a form of a dedicated hardware chip for artificial intelligence, or may be manufactured as a part of an existing general-purpose processor (for example, a CPU or application processor) or a graphic-dedicated processor (for example a GPU).

While the embodiments of the disclosure have been described with reference to the figures, it will be understood by those of ordinary skill in the art that various changes in form and details may be made therein without departing from the spirit and scope as defined by the following claims.

What is claimed is:

1. A hand-held electronic device for performing collision analysis, the hand-held electronic device comprising:

an inertial-measuring-unit (IMU) sensor configured to collect sensor data about movements of the hand-held electronic device, which are caused by an impact applied directly on an enclosure of the hand-held electronic device;

at least memory storing instructions; and at least one processor configured to execute the instructions to:

receive the sensor data from the IMU sensor;

detect that a collision event has occurred on the hand-held electronic device, based on the sensor data and detect collision data from the sensor data;

input the collision data into a collision classification model that is trained to predict a collision material type and a collision intensity of the collision event, wherein the collision material type corresponds to a floor or an object on which the hand-held electronic device is dropped; and determine a service action to be performed by the hand-held electronic device based on the collision material type and the collision intensity of the collision event, wherein the collision classification model comprises a first neural network that constitutes a collision material classification model and a second neural network that constitutes a collision intensity classification model, and wherein the collision material classification model and the collision intensity classification model share an input layer and hidden layers, and have separate output layers configured to output information of the collision material type and the collision intensity, respectively.

2. The hand-held electronic device of claim 1, wherein the collision classification model is trained for hierarchical multi-label classification.

3. The hand-held electronic device of claim 1, wherein the collision classification model is trained based on a combination of a material classification task loss between the predicted collision material type and a ground-truth material type label for a material classification task, an intensity classification task loss between the predicted collision intensity and a ground-truth intensity label for an intensity classification task, and a task consistency loss that represents a degree of match between the predicted collision material type and the predicted collision intensity.

4. The hand-held electronic device of claim 3, wherein the task consistency loss is computed by comparing a pair of the predicted collision material type and the predicted collision intensity with ground-truth inter-class relationships between sample collision material types and sample collision intensities.

5. The hand-held electronic device of claim 1, wherein the collision classification model is trained by:

accessing the sensor data from previous collision events with a plurality of material types;

generating a plurality of training examples by extracting portions of the sensor data for each of the previous collision events, wherein the extracted portions have a same duration but different start times and end times, and wherein each of the plurality of training examples is labeled with a material type and a collision intensity type of the previous collision events; and training the collision classification model with the plurality of training examples.

6. The hand-held electronic device of claim 1, wherein the service action comprises at least one of calling an emergency contact or notifying an administrator or a user of the hand-held electronic device.

7. The hand-held electronic device of claim 1, further comprising a user interface configured to receive user feedback about the collision event, wherein the user feedback comprises user inputs of the collision material type and the collision intensity of the collision event, and wherein the collision classification model is updated based on the user feedback.

8. A method for performing collision analysis by a hand-held electronic device, the method comprising:

receiving sensor data from an inertial-measuring-unit (IMU) sensor, the sensor data being related to movements of the hand-held electronic device, which are caused by an impact applied directly on an enclosure of the hand-held electronic device;

detecting that a collision event has occurred on the hand-held electronic device, based on the sensor data and detecting collision data from the sensor data;

inputting the collision data into a collision classification model that is trained to predict a collision material type and a collision intensity of the collision event, wherein the collision material type corresponds to a floor or an object on which the hand-held electronic device is dropped; and determining a service action to be performed by the hand-held electronic device based on the collision material type and the collision intensity of the collision event, wherein the collision classification model comprises a first neural network that constitutes a collision material classification model and a second neural network that constitutes a collision intensity classification model, and wherein the collision material classification model and the collision intensity classification model share an input layer and hidden layers, and have separate output layers configured to output information of the collision material type and the collision intensity, respectively.

9. The method of claim 8, wherein the collision classification model is trained for hierarchical multi-label classification.

10. The method of claim 8, wherein the collision classification model is trained based on a combination of a material classification task loss between the predicted collision material type and a ground-truth material type label for a material classification task, an intensity classification task loss between the predicted collision intensity and a ground-truth intensity label for an intensity classification task, and a task consistency loss that represents a degree of match between the predicted collision material type and the predicted collision intensity.

11. The method of claim 10, wherein the task consistency loss is computed by comparing a pair of the predicted collision material type and the predicted collision intensity with ground-truth inter-class relationships between sample collision material types and sample collision intensities.

12. The method of claim 8, wherein the collision classification model is trained by:

accessing the sensor data from previous collision events with a plurality of material types;

generating a plurality of training examples by extracting portions of the sensor data for each of the previous collision events, wherein the extracted portions have a same duration but different start times and end times, and wherein each of the plurality of training examples is labeled with a material type and a collision intensity type of the previous collision events; and training the collision classification model with the plurality of training examples.

13. The method of claim 8, wherein the service action comprises at least one of calling an emergency contact, notifying an administrator or a user of the hand-held electronic device, and logging the collision event.

14. The method of claim 8, further comprising:

receiving user feedback about the collision event, via a user interface, wherein the user feedback comprises user inputs of the collision material type and the collision intensity of the collision event, and updating the collision classification model based on the user feedback.

15. A non-transitory computer readable storage medium that stores instructions to be executed by at least one processor included in a hand-held electronic device to perform a method for performing collision analysis about the hand-held electronic device, the method comprising:

receiving sensor data from an inertial-measuring-unit (IMU) sensor, the sensor data being related to movements of the hand-held electronic device, which are caused by an impact applied directly on an enclosure of the hand-held electronic device;

detecting that a collision event has occurred on the hand-held electronic device, based on the sensor data and detecting collision data from the sensor data;

inputting the collision data into a collision classification model that is trained to predict a collision material type and a collision intensity of the collision event, wherein the collision material type corresponds to a floor or an object on which the hand-held electronic device is dropped; and determining a service action to be performed by the hand-held electronic device based on the collision material type and the collision intensity of the collision event, wherein the collision classification model comprises a first neural network that constitutes a collision material classification model and a second neural network that constitutes a collision intensity classification model, and wherein the collision material classification model and the collision intensity classification model share an input layer and hidden layers, and have separate output layers configured to output information of the collision material type and the collision intensity, respectively.

* * * * *